Dec. 2, 1947. R. L. WAGNER 2,431,781
METHOD AND APPARATUS FOR APPLYING METAL COATINGS
Filed July 3, 1943 3 Sheets-Sheet 3
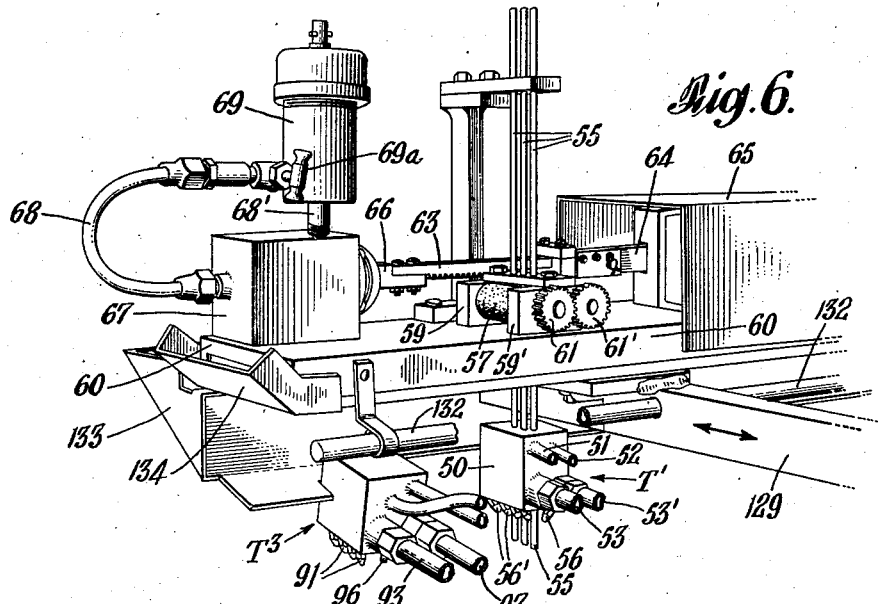
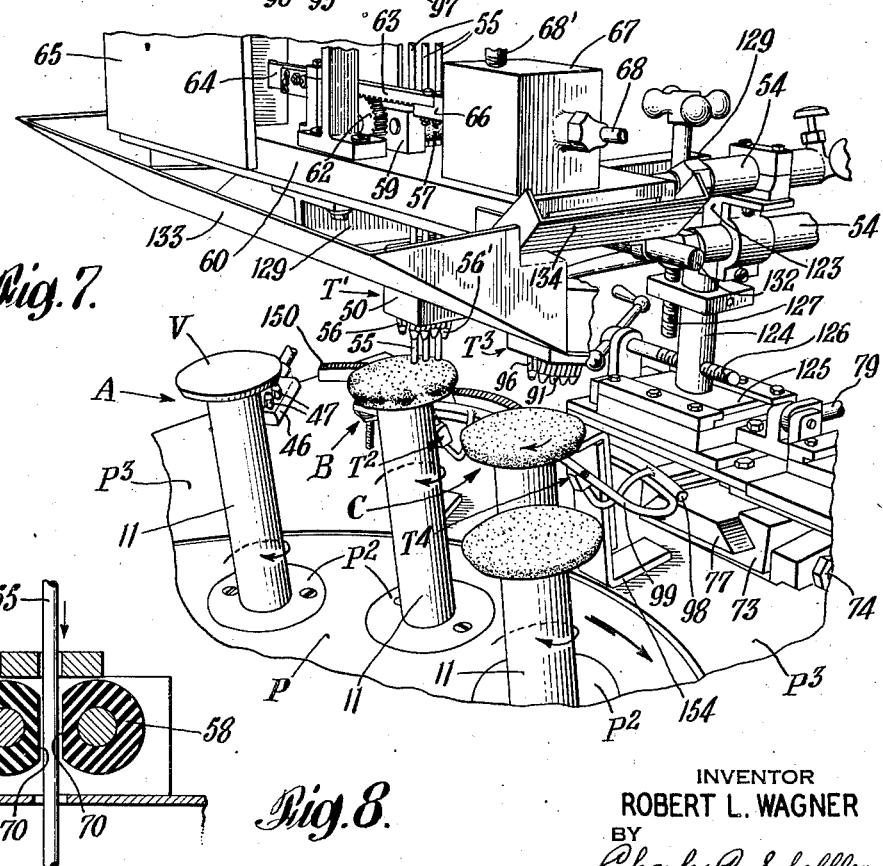
INVENTOR
ROBERT L. WAGNER
BY
Charles C. Scheffler
ATTORNEY Patented Dec. 2, 1947

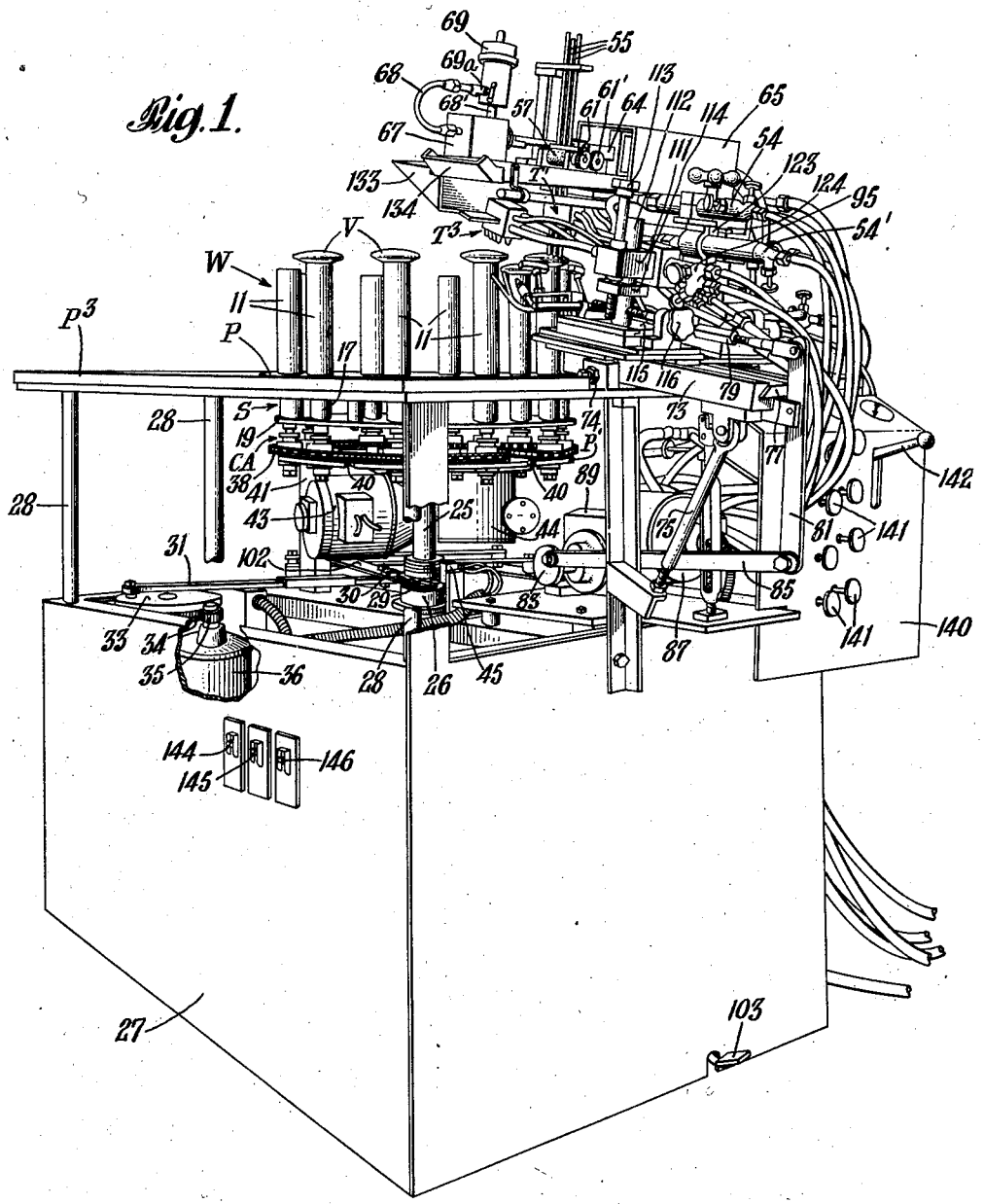

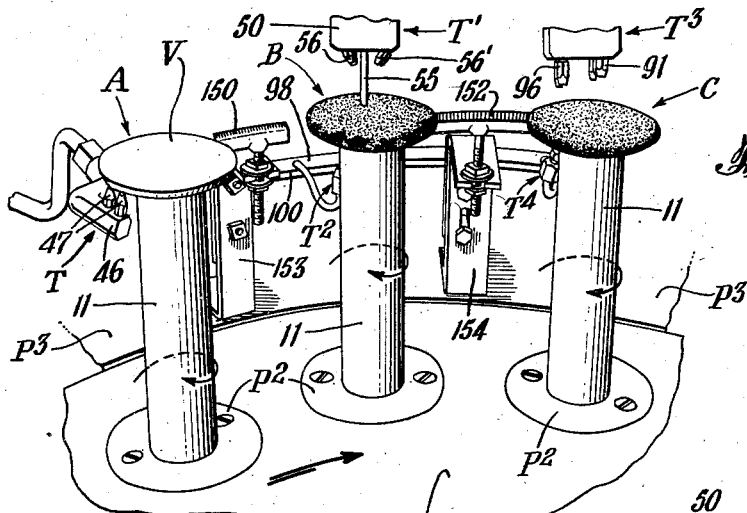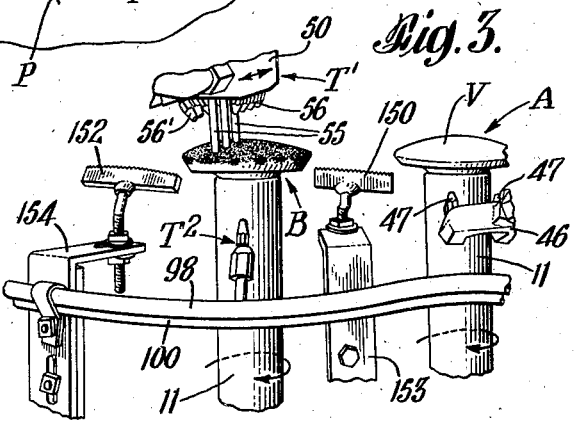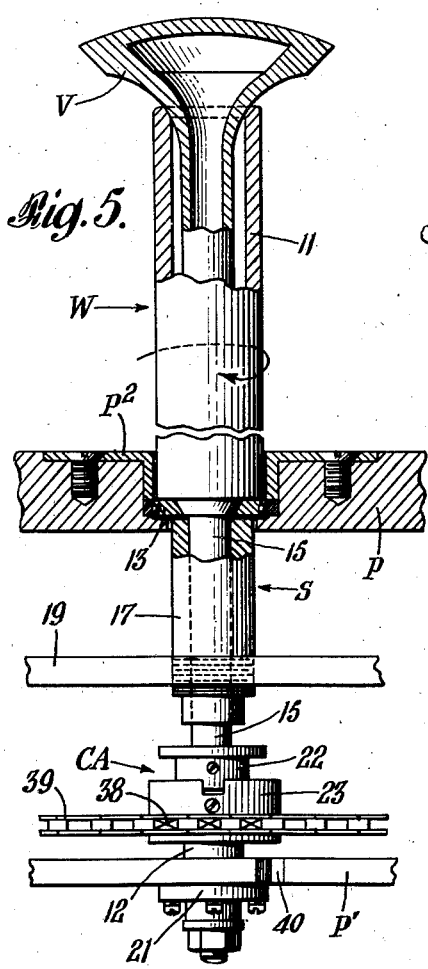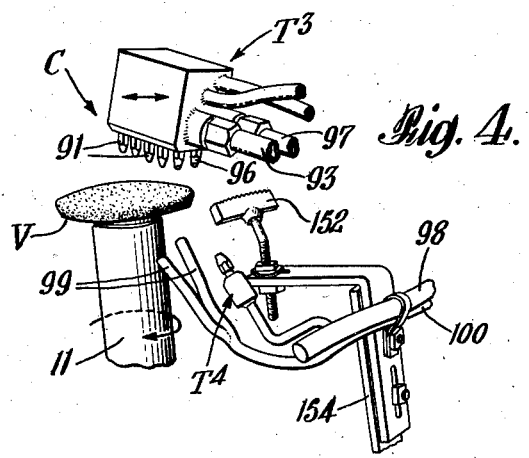

2,431,781

UNITED STATES PATENT OFFICE 2,431,781

METHOD AND APPARATUS FOR APPLYING METAL COATINGS

Robert L. Wagner, Niagara Falls, N. Y., assignor to Haynes Stellite Company, a corporation of Indiana Application July 3, 1943, Serial No. 493,362

22 Claims. (Cl. 117—131)

This invention relates to welding and brazing; and more especially it concerns a method and apparatus for applying uniform, smooth, welded-on overlays, coatings, or facings upon the surfaces of metal articles. The invention has especial utility for the deposition, upon the convex dome surfaces of valves and like articles having the shape of solids of revolution, of uniform, smooth, welded-on overlays of selected thickness, of wear-resistant and/or corrosion-resistant protective metals and alloys, such as those of the class of non-ferrous alloys composed of cobalt, chromium, and tungsten; and alloys having a nickel base and containing appreciable amounts of chromium and perhaps other elements. For convenience, the following description is directed principally to this application of the invention.

In recent years there has been an extremely rapid development of internal combustion engines of high power, particularly for use in aircraft and various types of land vehicles designed for use under extreme service conditions. Such engines necessarily operate at extremely high temperatures for long periods of time. It is now common practice to employ in these engines valves having hollow heads containing a cooling medium, such as sodium, etc., to increase the rate of heat withdrawal and afford protection for the valves at high temperatures. Such valve heads have relatively thin dome walls and very heavy peripheral sections. Nevertheless, the valves sometimes become red hot under service conditions.

Attempts were made to protect the dome surfaces of poppet-type valves by manually weld-depositing on the dome surfaces a thin layer of a wear- and corrosion-resistant alloy. Such procedures were slow and tedious, and involved preheating the valve head by heat directed upon all parts thereof; or upon the dome surface of the valve. However, apparently due to the fact that the metal layer forming the valve dome surface was relatively thin, there commonly occurred during the pre-heating and/or the surfacing operation an incipient, slight collapse of the dome surface when welding heat was concentrated on its upper surface. Furthermore, as a result of unavoidable variations in manual welding operations, the surface coating of protective metal often was porous, and contained laps with included slag, etc. This has resulted in the rejection of many of these valves after much valuable time and money had been expended. The present invention has effectively overcome this difficulty while increasing the rate of production of such valves.

Among the more important objects of the invention are: to provide in novel manner upon the convex, flat or concave dome surface of a valve head or other metal article exposed to high temperatures and corrosive influences, a welded-on overlay of a protective metal; to provide in novel manner for preventing or minimizing the collapse of the dome surface of a valve head while the latter is being provided with a weld-on overlay of a protective metal; and to provide in novel manner for the production of a succession of articles having substantially identical convex, flat or concave surfaces provided with uniform, smooth, welded-on overlays of a protective metal. These and other objects will be evident as the following description proceeds.

In the accompanying drawing, illustrating one preferred embodiment of the invention adapted to provide an overlay of wear-resistant metal upon the dome surface of a valve head, Fig. 1 is a perspective view of the general apparatus assembly, parts being broken away, and other parts being omitted;

Fig. 2 is a fragmentary perspective view of the respective preheating, welding and overlay-conditioning stations, parts being broken away and other parts being omitted;

Fig. 3 is a fragmentary perspective view showing the relationship of two valves and associated apparatus elements at the respective preheating and welding stations;

Fig. 4 is a fragmentary perspective view showing the relationship of a valve and associated heating and cooling means at an overlay-conditioning station;

Fig. 5 is an elevation, partly in section of a work table and associated parts, portions being broken away;

Fig. 6 is a fragmentary perspective view showing the welding rod-feeding mechanism and associated parts, portions being broken away;

Fig. 7 is a fragmentary perspective view showing the relationship of valve supports, turn table, heating torches and related parts, and welding rod-feeding mechanism, parts being broken away, and other parts being omitted; and Fig. 8 is a transverse vertical section through the welding rod-feed rolls.

Referring to the drawings, the apparatus comprises a plurality of spaced hollow work-supports W, each having a spindle assembly S mounted for rotation upon a circular rotatable platform P and a sub-platform P'. Each support W comprises two aligned sections 11 and 12, which respectively carry the interlocking members 22, 23, of a clutch assembly CA. Each member 11 is supported for rotation in a bearing housing 13 secured to a plate P² mounted on platform P, and has an extension 15 rotatable within a corresponding tubular guide 17 secured to platform P and to a plate 19. Each member 12 is housed for rotation in a bracket 21 on sub-platform P'. The platforms P and P', and plate P² are secured upon a rotatable shaft 25 (see Fig. 1) supported in thrust bearings in a housing 26 carried by a frame 27. The latter preferably is so constructed that the platform P and associated parts are slightly tilted to provide that the dome portion of a valve head exposed to the welding heat at any given time is at least approximately horizontal. It will be understood that only the rotating platform need be tilted. A fixed platform $P^3$ surrounds the platform P and is supported by the frame 27 through members 28.

For rotating the platforms P, P' at uniform intervals through a selected arc, and for intermittently maintaining each work table W at a selected work station during a selected period of time, a ratchet 29 secured to shaft 25 engages a pawl 30 carried by the arm 31 of a crank 33. The latter is secured to a gear 34 which meshes with a pinion 35 of a reduction gear 36 connected with an electric motor (not shown). Other well-known means for imparting intermittent rotary movement to the platform P at uniform intervals, may be used, such as mechanism for producing Geneva movement by special intermeshed gears, one of which is a partial gear.

For rotating each of the work tables there is provided on each member 12 a corresponding pinion 38. Each pinion is operatively connected with the others by an endless chain 39. An adjustably-mounted idler roll provides for maintaining the chain taut. For locking the platforms P and P' in selected position at the respective work stations, grooves 40 are formed in the sub-platform P' intermediate successive work tables 11, and each groove is adapted to receive, in turn, a spring-pressed pin (not shown) carried upon a support 41 connected with frame 27. A motor 43 is connected through a reduction gear 44 and bevel gears (not shown) with one of the spindle members 12, whereby operation of the motor causes rotation of each work support at the same selected fixed rate. Motor 43 is energized by an electric current flowing thereto through a brush and slip-ring device 45 of well-known type.

In accordance with the invention, the upper surface of each valve or other article, or a succession of such articles to be provided with welded-on overlays of protective metal, is subjected to high temperature heating operations at each of three successive stations during which rotation of the platform P is discontinued, while continuing rotation of each valve and its support.

The three successive stages of the process will hereinafter be designated, respectively, the preheating stage A, the welding or surfacing stage B, and the remelting or metal-conditioning stage C. (See Fig. 2.) During each stage, the valve is frictionally supported upon a work table, with the valve stem extending within the spindle, and the valve being supported upon the under surface of the head, as shown in Fig. 5.

In the preheating stage, a plurality of flames from an oxy-fuel gas preheating torch or the equivalent are directed to impinge upon the under surface of the valve head over a considerable area, during rotation of the valve and valve support, to bring the metal at the upper or dome surface of the valve to a temperature near but below its melting point. This is effected, in the form shown in Figs. 2, 3, and 7, by a U-shaped torch T with a head 46 having four tips 47, and connected with the usual type of welding torch (not shown). Preheating in this manner is especially desirable when surfacing the domes of valves designed for use under extreme service conditions and having hollow heads provided with cooling fluid, together with very heavy peripheral sections, as shown in Fig. 5. Owing to the relatively great differences in metal thickness between the peripheral sections and the central part of the dome, unequal expansion occurs during the surfacing operation when following the practice used prior to this invention, with a resultant tendency for the valve dome to bend in or collapse at its apex. By the present application of preheating flames to the under side of the valve head rather than to the entire valve head, or to the upper surface thereof, this tendency to collapse is prevented or minimized.

In the surfacing stage, two independently-controlled welding torches preferably are employed. One torch head T' directs welding flames upon the uppermost portion of the dome surface of the valve head and upon the lower ends of a plurality of welding rods, to prepare the valve head, and to melt the welding rods and deposit molten surfacing metal on the valve dome surface. A second torch or torch $T^2$ concurrently directs heating flames on the under side of the valve head at and adjacent the peripheral margins of greater metal thickness.

In the remelting, smoothing and conditioning stage the valve, having on its dome surface an overlay of protective metal, is heated, while still at high temperature from the welding operation, by oxy-fuel gas flames or the equivalent. In the form shown, the required heat is provided by two torch heads, $T^3$ and $T^4$. Torch head $T^3$ directs welding flames upon the overlay of protective metal in an elongated remelting zone on the top or dome surface of the valve head, and extending from about the center of the head to an outer peripheral margin and serves to remelt successive portions of the latter and smooth the deposit. Torch head $T^4$ directs heating flames upon the under side of the valve head to assist the heat from torch head $T^3$ in remelting the protective metal.

During the welding and the remelting operations, the torch heads T' and $T^3$ are reciprocated back and forth at a uniform selected rate along a fixed path at the upper surface of the respective valve heads being treated, while the torch heads T, $T^2$ and $T^4$ preferably occupy fixed positions.

For concurrently depositing a plurality of bodies of protective metal upon the dome surface of the valve or other article, and for applying welding heat progressively to successive portions of such dome surface, the torch head assembly T' shown in Figs. 2, 3, 6 and 7 comprises an elongated torch block 50 having therein a passage for circulating a cooling fluid and provided with inlet and outlet lines 51, 52. Also formed in block 50 are two passages for a combustible gas mixture respectively connected through conduits 53, 53' with the mixing chambers of corresponding welding torches 54, 54', supplied with a welding gas and oxygen from suitable sources of supply (not shown).

For supporting a plurality of rods 55 of the desired protective metal in contact with the valve dome, a plurality of open-ended guide tubes extend through the block 50 and are closely spaced in a row extending longitudinally of the block. The arrangement is such that each tube guides and loosely houses for free longitudinal movement a welding rod 55 of the protective metal which rests upon the valve head under the action of gravity.

For directing welding heat upon the lower ends of the welding rods 55 and upon the contiguous portions of the valve dome surface, two spaced rows of tips 56, 56' are secured to block 50 on opposite sides of the rods 55, and direct welding flames upon each rod, conveniently at an angle of about 60° with respect to the axis of the rod. Each of the tips of one row communicates with torch 54, while each of the tips of the other row communicates with torch 54'. Welding apparatus suitable for this service is described in my United States Patent No. 2,295,701.

For controllably feeding the welding rods as a unit to the welding zone at the beginning of a surfacing operation and for retracting them as a unit after such operation, a pair of cooperating rolls 57, 58, are mounted for rotation in blocks 59, 59' carried by an inverted channel member 60 which extends above the welding zone. The rolls 57, 58 are surfaced with a suitable resilient material such as rubber, and are interconnected by gears 61, 61'. For driving the rolls in unison, a pinion 62 (Fig. 7) mounted on the axis of roll 58, meshes with a rack 63, one end of which is connected with the lever arm 64 of a pair of "push and pull" solenoids mounted within a housing 65 carried by member 60. The other end of rack 63 is connected with a piston rod 66 of a piston operating in a block 67. The opposite ends of the piston chamber are connected through conduits 68, 68' with a dashpot 69 to control the speed of movement of the rack 63. The speed of movement is regulated by needle valve 69a.

A portion of the surface of each roll 57, 58 is flattened, as shown at 70 in Fig. 8, whereby, upon suitable positioning of the rolls by action of the solenoid in housing 65, the rolls take the position shown in Fig. 8 and release the rods 55 which then drop and rest freely with their lower ends on the valve dome to be surfaced. After the surfacing operation, actuation of the solenoid causes the rolls to retract the rods 55 from the welding zone.

For supporting the torch heads T' and T³ and the rod-feeding mechanism, and for reciprocating these members and associated parts in unison at a preselected rate along a path of fixed length, a bearing plate 73 has an end pivotally mounted at 74 upon the platform P³, and has its opposite end secured to a member of frame 27 by an adjustable brace member 75, as shown in Fig. 1. A platform 77 is mounted in grooves in the plate 73 for reciprocation toward and away from the welding station. For reciprocating that platform 77, an adjustable rod 79 has an end secured to said platform, its other end being pivotally connected with one end of a lever 81 fulcrumed to the plate 73. The other end of lever 81 is operatively connected by a lever 85 with a crank 83 driven by motor 87 through reduction gear 89.

For remelting and conditioning the welded-on surface layer of metal on the valve head, in the form of the invention illustrated, torch head T³ is provided with a row of tips 91 adapted to direct remelting flames upon the valve head along a zone extending from about the center of the upper surface of the head to an outer margin thereof (see Fig. 7). Each tip 91 is connected through a passage in the torch head with a gas inlet connection 93 (see Fig. 4) leading to a blowpipe 95 (see Fig. 1). A second passage in torch head T³ connects a row of tips 96 with an air inlet connection 97 connected with a source of air under pressure through a valve-controlled conduit (not shown). The flames from tips 91 impinge upon successive portions of a valve dome surface during rotation of the valve just before that portion of the curved surface has passed its uppermost position; while the air from tips 96, when employed during the latter part of the remelting stage, impinges upon portions of the valve dome at some point before they reach the uppermost position. A torch head or tip T⁴, connected through conduit 98 with a welding torch (not shown), directs a supplemental heating flame upon the under surface of the valve head adjacent the outer margin thereof. Two air jets 99, 99 discharge streams of air from a valve-controlled conduit 100 upon the under surface of the valve head from a suitable source of supply under pressure.

For discharging air from tips 96 and 99 upon the upper and lower surfaces of a valve head at a selected point in the remelting stage, an oscillating arm 102 (Fig. 1) is secured to the ratchet 29 and pivoted to the crank arm 31. The free end of arm 102 contacts a tripping element of an air valve (not shown), opening the latter when moving in one direction and closing it when moving in the other. A foot pedal 103 is operatively connected with the air valve for opening this valve.

For moving the torch head T³ radially across the upper surface of a valve at the remelting zone C, the blowpipe 95 is adjustably secured to a block 111 mounted for vertical sliding movement upon a support 112 under action of an adjusting screw 113 extending through block 111 and having a threaded portion engaging a similar portion of a plate 114 secured to support 112. The support 112 is mounted on a plate 115 slideable on platform 77 toward and from the remelting zone under action of an adjusting screw 116 and associated parts. (See Fig. 1.)

For supporting the torch head T' and the welding rod-feeding mechanism for reciprocation across the valve head or other article, the torch bodies 54, 54' are secured by clamps to a block 123 (Fig. 7) slideable along a post 124 that is mounted upon a plate 125. The latter is slideable in grooves transversely of platform 77 under action of an adjusting screw 126 and associated parts. The block 123 is vertically adjustable by means of adjusting screw 127, in manner similar to block 111 shown in Fig. 1. The support 60 for the welding rod-feeding mechanism is mounted upon a lateral member 129, which, in turn, is secured upon the block 123 for movement therewith.

For directing a current of cooling fluid such as air around the rod-feeding mechanism during a surfacing operation, a conduit 132, connected with a source of air under pressure, has closely spaced orifices directed to discharge air under presure within an open housing 133 secured to the channel member 60. An additional conduit (not shown) directs a stream of air through channel member 60 to keep the rod-feeding mechanism cool. This air comes out and is directed upwards away from the operator by member 134.

It is highly desirable, in the interests of economy of materials and the securing of uniformly good welding of the protective metal to the metal of the article, that the deposition of protective metal be initiated at the hottest point in the valve dome surface—i. e., the part which was last exposed to the preheating flames. Since the indexing movements of the platform P often may require ten or more seconds, and since each work table is continuously rotating at all times, the hottest point on the valve dome surface normally will have passed the zone on which the welding flames first impinge upon arrival of the valve at the welding station. For insuring that the welding flames initially impinge upon the hottest part of the dome surface of the preheated valve, there is provided, between the preheating and welding stations and in the line of travel of such valve head, a curved bar 150 having a knurled or milled upper surface adapted to contact the under side of each valve head and to frictionally lift and support the same as the valve moves to the welding station with the work table. As a result, the valve slides upon the latter and rotates along the milled surface of the bar. Thus, by adjusting the length of the bar, the valve may have its angular path of travel while moving between stations reduced any selected amount, or actually reversed. After the valve head passes the bar 150 it is again frictionally supported by and rotates with the work table. The length of the upper surface of the bar 150 is so selected that the point of final heating at the preheating station substantially coincides with the point of initial heating at the welding station.

It is highly desirable that, when the remelting flames first impinge upon the surfaced valve head, all of the overlay metal shall have solidified and be ready for conditioning. For effecting this purpose, the rotation of the valve on its longitudinal axis during movement to the conditioning station is retarded, or the direction of rotation reversed, whereby the reheating flames are initially directed upon the coolest portion of the valve head which has been permitted to cool sufficiently to solidify the metal. Burning or undue melting or other injury to the overlay metal, or undue interalloying thereof with the base metal of the valve, is thus prevented or minimized.

For this purpose, there is employed a curved bar 152, similar to the bar 150 and functioning in like manner, but having a greater length than the latter. The bars 150 and 152 are mounted for vertical adjustment upon supporting members 153, 154 secured upon the fixed platform P3, as shown in Fig. 2.

A preferred embodiment of the apparatus has 10 work supports and 10 indexing positions. The preheating, surfacing and remelting stages are effected at three successive stations, as previously described.

Operating controls for the apparatus are on panel 140 (Fig. 1). Valve handles 141 respectively control the flow of combustible gas mixtures to torches T to T⁴, and the flow of air to tips 96 and to the air jets 99. Lever 142 controls the valve-indexing mechanism and the welding rod feeding mechanism when the motor driving the crank 33 is actuated. The lever 142 assumes five positions in its vertical path of travel. In the second, the welding rods are lowered to the work and released; in the fourth, the welding rods are raised away from the work; and in the fifth, the work table-indexing mechanism is actuated to move each work table to the next operating station. The first and third positions are neutral.

Switches 144, 145 and 146, respectively, are in electric circuits controlling the rotation of the platform P; controlling the motor driving the work-indexing mechanism; and controlling the motor 67 actuating the torch-reciprocating mechanism.

In the practice of the invention, using apparatus of the type described, assuming that an operation has just been completed, and that there is a preheated valve at the preheating station, a surfaced valve at the welding station, and a finished valve at the remelting station, and that the motors respectively rotating the platform P, revolving the work tables 11, and reciprocating the torch mechanisms are functioning; that an air current flows around the rod-control mechanism; that the torches T to T⁴ and the air jets 96 and 99 are adjusted, as at the end of a valve conditioning operation, the lever 142 is moved, whereby each of the valves moves to the next adjacent station, and a valve to be surfaced is brought to the preheating station A. The valve head is preheated on its under side at such station, the arrangement being such that the preheating period required is approximately that employed in the next or surfacing operation for providing the overlay of protective metal. In the case of certain poppet-type valves for internal combustion engines, such as shown in Fig. 5, this period ranges between two and three minutes. Following the preheating step, the control lever 142 is moved to cause the work indexing mechanism to move each valve to the next succeeding station. The preheated valve moving towards the surfacing station B contacts the upper surface of bar 150 and is held thereon, thus reducing its rate of rotation or reversing the direction of rotation, whereby the hottest point on the preheated valve dome surface will be first contacted by the flames from torches T¹ and T². The indexing operation generally requires around 12 seconds; and the valves and supports normally rotate at a rate of about 0.4 revolution per minute.

Upon arrival of the preheated valve at the welding station, the valve is further heated by torches T¹ and T³ for a brief period, commonly around 7 to 10 seconds, after which lever 142 is actuated to lower the rods of protective metal slowly upon the valve head in manner previously described. The protective metal melts to form a thin film that is intimately united with the valve dome without undue interalloying with the metal of the valve, a time of around 2.5 minutes to 3 minutes commonly being required for the complete surfacing of a valve dome. This time will vary, depending upon the size and design of the valve, the type and arrangement of torches, and upon other factors. The lever 142 is then actuated to raise the welding rods, after which it is again actuated to move the work tables and valves to the next succeeding stations, thereby moving the surfaced valve to the remelting station. At the latter station, successive portions of the solidified protective metal on the valve dome are remelted under conditions preventing objectionable interalloying of such metal with the valve metal. The valve, as it moves from the welding station to the remelting station, contacts the upper surface of bar 152 which causes sufficient slippage of the valve with respect to the work support that the remelting flames are initially directed upon the coolest portion of the valve head heated during the surfacing operation, the overlay metal on which has solidified before reaching the remelting station.

As the rotating valve reaches the latter station, flames from the remelting tips 91 contact successive portions of the upper surface to remelt such successive portions and smooth the upper surface of the overlay. Generally, the remelting operation requires around 2.5 minutes, after which a blast of cooling air is directed upon the respective upper and lower surfaces of the valve head by operating the pedal 103 which opens an air valve controlling the flow of air to torch T³ and jets 99 in cooperation with lever arm 102.

Each successive indexing movement of the platform P moves a finished valve from the remelting station. When each such valve is sufficiently cooled, it is removed from its work table and replaced with another valve to be surfaced. It will be understood that numerous departures may be made from the apparatus construction herein described, and from the steps of the process as described, without departing from the spirit of the invention. Thus, it will be evident that the respective means for indexing the work tables, and for raising and lowering the welding rods, and for opening and closing the valves controlling the various welding torches and air jets may be completely automatic; and that other means may be substituted for those shown for retarding the rotation of the valves or other work, or for reversing the direction of rotation thereof through a selected arc, during movement of the article between the successive work stations mentioned.

The invention is susceptible of modification within the scope of the appended claims.

I claim:

1. In the process for forming a welded-on overlay of a protective metal upon a surface of a metal article of revolution, which surface is intersected by the axis of revolution of said article, in which process the said surface is preheated and the thus preheated surface is provided with an overlay of the protective metal, the steps which comprise supporting such article with the uppermost portion of said preheated surface approximately horizontally positioned, directing against such surface at least one row of closely-spaced welding flames and a row of closely-spaced bodies of a protective metal within an elongated welding zone disposed approximately radially of said axis of revolution and extending between said axis and an outer margin of said surface, causing relative movement between said preheated surface and the respective rows of welding flames and bodies of protective metal in an annular path about an axis corresponding with the axis of revolution of said article, while causing relative reciprocatory movement between said preheated surface and the respective rows of welding flames and bodies of protective metal in a direction approximately radially of said axis along a path of fixed length, and concurrently directing flames of lesser intensity upon a second surface of said article remote from the first-named surface, and so correlating the intensity of the respective welding flames and the rate of relative movement between said preheated surface and the respective rows of welding flames and bodies of protective metal that the molten metal from said respective bodies merges at said welding zone and provides said surface with a continuous welded-on overlay of protective metal during substantially one circuit within said annular path.

2. In a process for forming a welded-on overlay of a protective metal upon a preheated surface of a metal article of revolution, which surface is intersected by the axis of revolution of said article, the steps which comprise rotating such surface at a selected rate about its axis of revolution with the uppermost portion of such surface approximately horizontally positioned, directing against such rotating surface a plurality of closely-spaced welding flames disposed in at least one row between such axis of rotation and an outer periphery of said surface, thereby defining an elongated welding zone, feeding a row of closely-spaced bodies of protective metal against such rotating surface in said welding zone to melt each of said bodies and form a continuous deposit of molten metal and to weld the same to successive portions of such surface, reciprocating said welding flames and said bodies of weld metal along a selected path of fixed length extending approximately radially of said surface of revolution and from said axis of rotation to an outer margin of such surface, concurrently directing supplemental heating flames upon a second surface of said article, and so correlating the intensity of the respective welding flames and the rate of rotation of the article that the molten metal from said respective bodies merges at said welding zone and provides said surface with a continuous welded-on overlay.

3. In the process for forming a welded-on overlay of a protective metal upon a preheated surface of a metal article of revolution, which surface is intersected by the axis of revolution of said article, while preventing collapse of said surface, the steps which comprise rotating such article about its axis of revolution with the uppermost portion of such preheated surface approximately horizontally positioned, directing against such rotating surface at least one row of closely-spaced welding flames disposed within an elongated welding zone extending substantially from said axis to an outer margin of said surface, directing a row of closely-spaced bodies of a protective metal against such rotating surface and into the path of said flames within said welding zone to melt each of said bodies and form a continuous deposit of molten metal upon said surface and to weld the metal to successive portions of such surface during at least one complete revolution of said surface about said axis, reciprocating said welding flames and said bodies of metal along a path of fixed length extending approximately radially of said axis within said welding zone, concurrently supplying supplemental welding heat to said surface by flames directed upon a second surface of said article at points remote from the first-named surface, and so correlating the intensity of the respective welding flames, and the rate of rotation of the article that the molten metal from said respective bodies merges at said welding zone and provides said surface with a continuous welded-on overlay during substantially one revolution of said article.

4. In the process for providing a welded-on overlay of a protective metal upon the dome surface of the head of a valve rotatable upon an axis of revolution extending longitudinally through the stem of such valve, in which process the valve is rotated about such axis with the uppermost portion of said dome surface horizontally positioned while preheating flames are directed upon said valve head, the improvement which comprises directing against successive portions of such rotating preheated dome surface a plurality of closely-spaced bodies of a protective metal disposed in a row within a welding zone on said dome surface extending radially of said axis of revolution and between the latter and an outer margin of said dome surface, concurrently directing upon said dome surface within said welding zone and upon the portions of said metal bodies contacting such surface welding flames disposed in at least one row approximately radially of said axis and between the latter and an outer margin of said dome surface, and continuously reciprocating such bodies of metal and said welding flames in unison at a fixed rate along a path of fixed length disposed approximately radially of said axis within said welding zone, while directing heating flames of lesser intensity upon the under surface of the valve head, thereby forming a continuous deposit of protective metal on such dome surface and welding the deposit to such surface during substantially one revolution of said article.

5. Process for providing a welded-on overlay of a protective metal upon the dome surface of the head of a poppet-type valve having a valve head and a valve stem, which comprises rotating such valve about its longitudinal axis with said dome surface uppermost while directing preheating flames upon the under surface of said valve head, thereafter during rotation of the thus preheated valve through at least one revolution contacting successive portions of such dome surface with a row of closely-spaced bodies of protective metal disposed approximately radially of said axis of rotation and between the latter and an outer margin of said dome surface, while directing at least one row of welding flames upon the portions of said bodies of metal in contact with said dome surface and upon successive portions of the dome surface contacted thereby in an elongated welding zone extending substantially from said axis to said outer margin of the dome surface, and while reciprocating said bodies of protective metal and said welding flames along a path of fixed length within said welding zone, concurrently directing supplemental heating flames upon said under surface of the valve head, and correlating the intensity of the respective flames and the rate of rotation of the valve whereby all portions of the dome surface are brought to a welding temperature and provided with a continuous welded-on metal overlay during approximately one revolution of the valve on its axis of rotation.

6. Process for providing a welded-on overlay of a protective metal upon the dome surface of the valve head of a valve rotatable upon a longitudinal axis of revolution intersecting such surface, which comprises rotating such valve at a selected rate about said axis while the latter is tilted with the uppermost portion of said dome surface horizontally positioned, preheating such surface by heat directed upon the under surface of the valve head, thereafter directing into contact with successive portions of such rotating dome surface a row of closely-spaced bodies of a protective metal extending approximately radially of said axis and between the latter and an outer margin of said dome surface, concurrently directing upon successive portions of said dome surface and upon the contacting portions of said bodies welding flames disposed in at least one row, continuously reciprocating such bodies of metal and said welding flames at a fixed rate along a path of fixed length defining a welding zone extending approximately radially of said axis between the latter and said outer margin of the dome surface, thereby forming a continuous welded-on deposit of protective metal on said rotating surface, and after at least a portion of the deposit of protective metal on such surface has solidified directing remelting flames upon successive portions of the solidified surface deposit, while concurrently directing supplemental heating flames upon the under surface of the valve head, thereby remelting such portions of the solidified metal and smoothing the free surface of the remelted portions, and thereafter directing a cooling fluid upon at least the under surface of the valve head, thereby conditioning the deposited metal and providing a valve having on its dome surface a uniform, smooth, welded-on overlay of protective metal.

7. Process for providing the dome surface of the head of a poppet-type valve with a welded-on overlay of a protective metal while preventing collapse of the dome surface, which comprises rotating such a valve about a longitudinal axis with said dome surface uppermost, directing oxy-fuel gas preheating flames upon the lower surface of the valve head, thereby preheating the rotating dome surface of said head, thereafter in an elongated welding zone progressively depositing a molten protective metal upon successive portions of the preheated rotating dome surface from a row of closely-spaced bodies of protective metal disposed approximately radially of said axis of rotation while reciprocating such bodies of protective metal along said dome surface at a fixed rate in said welding zone along a path disposed approximately radially of said axis and extending between the latter and an outer margin of the dome surface, concurrently directing supplemental welding heat upon said lower surface of the valve head, thereafter discontinuing such metal deposition and, after the molten metal has solidified, directing at least one remelting flame upon successive portions of the free surface of the deposited metal in an elongated remelting zone, while reciprocating such remelting flame across said dome surface toward and from said axis of rotation, and concurrently directing supplemental heat of lesser intensity upon the under surface of said valve head, thereby remelting successive portions of the solidified metal and smoothing the overlay, and thereafter cooling the overlay metal to below its melting point.

8. Process for providing an overlay of protective metal upon the dome surface of the head of a poppet-type valve, which comprises supporting a plurality of such valves in spaced relation upon a movable support, intermittently moving said support a selected distance along a fixed path, and thereafter discontinuing such movement, thereby defining a plurality of stations including a work-preheating station, a work-surfacing station, and an overlay-remelting station; continuously rotating each of said valves while at said stations at a selected rate upon a longitudinal axis intersecting the dome surface, preheating the head of each of a succession of such rotating valves while the valve is located at the preheating station, moving the preheated valve to said surfacing station, directing successive portions of a continuous body of a protective metal from a row of closely-spaced bodies thereof upon said preheated dome surface during rotation of the valve, while directing welding flames upon said dome surface and upon each of said bodies within an elongated welding zone extending between said axis and an outer margin of said dome surface, and while directing less intense heating flames upon the under surface of the valve head, thereby covering said dome surface of each of a succession of valves with a continuous layer of molten overlay metal during one revolution of each of such valves while located at said surfacing station, discontinuing the application of welding heat and the feed of protective metal to the dome surface of each successive valve after at least one complete revolution thereof, moving the thus surfaced valve to said remelting station after at least a portion of the surface deposit has solidified, directing remelting flames upon successive portions of the solidified surface deposit of overlay metal and concurrently directing flames of lesser heating capacity upon the under surface of the valve head, thereby remelting successive portions of the overlay metal and smoothing the same while preventing undue interalloying of the overlay metal and the valve metal, and thereafter cooling the overlay metal to below its melting point.

9. Process for providing a welded-on overlay of protective metal upon the dome surface of the head of a poppet-type valve, which comprises supporting in spaced relation on a movable support a plurality of such valves, each supported for rotation on a longitudinal axis, continuously rotating each of said valves upon its support at a selected rate on said longitudinal axis, intermittently moving such support a selected distance along a fixed path, and thereafter discontinuing such movement, thereby defining a plurality of stations, including a work-preheating station, a work-surfacing station, and an overlay-remelting station; preheating the dome surface of each of a succession of valves by directing heating flames upon the under surface of each of such valve heads while located at said preheating station, moving the preheated valve to said surfacing station, directing a row of closely-spaced preheated bodies of protective metal and at least one adjacent row of closely-spaced welding flames upon successive portions of the dome surface of each of a succession of such preheated valves within an elongated welding zone on said dome surface disposed approximately radially of said axis and extending substantially from said axis to an outer margin of said dome surface, reciprocating said welding flames within said welding zone, concurrently directing heating flames of lesser intensity upon the under surface of the valve head, correlating the intensity of the respective flames and the rate of rotation of the valve, whereby all portions of the dome surface are brought to a welding temperature and provided with a welded-on metal overlay during approximately one revolution of the valve on its axis of rotation, moving the surfaced valve to said remelting station and, after solidification of at least a portion of the overlay metal, directing remelting flames upon successive portions of such solidified overlay metal and concurrently directing supplemental heating flames of lesser intensity upon the under surface of said valve head, thereby remelting such successive portions of overlay metal and smoothing the same, and thereafter directing a cooling fluid upon at least the under surface of said valve head, thereby cooling and solidifying the overlay metal.

10. Apparatus for applying a welded-on overlay of protective metal upon a surface of an article of revolution which surface is intersected by the axis of rotation of said article, which comprises means for supporting said article with said surface uppermost; means for rotating such support upon the axis of rotation of said article; means for directing each of a row of bodies of protective metal into contact with successive portions of said surface within an elongated welding zone upon said surface of the rotating article while thus supported, said welding zone extending substantially from the axis of revolution of said article to an outer margin of said surface; torch means for directing welding flames upon the said surface within said welding zone and upon the bodies of protective metal during the feed thereof; means for reciprocating said welding flames and said row of bodies of protective metal in unison along paths contacting said surface within said welding zone between said axis of rotation and an outer margin of said surface; and means for directing supplemental welding heat upon a surface of the article remote from said first-named surface.

11. Apparatus for applying a welded-on overlay of protective metal upon the dome surface of the head of a poppet-type valve, which comprises mechanism for rotating such valve at a selected rate upon its longitudinal axis with said surface uppermost; and means for applying a welded-on overlay of protective metal upon successive portions of such surface in an elongated welding zone extending between said axis and an outer margin of said dome surface, said means including mechanism for directing upon said dome surface within said welding zone a row of closely-spaced bodies of protective metal, each having a portion freely resting upon said surface, and at least one row of closely-spaced oxy-fuel gas torches directed to discharge welding flames upon each of said bodies and upon successive portions of said dome surface within said welding zone; means for withdrawing all of said bodies as a unit from said welding zone; means for reciprocating said torches and said bodies of protective metal at a fixed rate along a path of fixed length corresponding with said welding zone and extending between said axis and an outer margin of the dome surface; and means for directing supplemental heat upon a second surface of said valve head.

12. Apparatus for applying a welded-on overlay of protective metal upon the dome surface of the head of a poppet-type valve, which comprises mechanism for rotating such valve at a selected rate upon its longitudinal axis with said surface uppermost; means for applying a welded-on overlay of protective metal upon successive portions of such surface within an elongated welding zone disposed approximately radially of the axis of rotation of said valve and extending between the latter and an outer margin of said dome surface, said overlay applying means including mechanism for directing upon said surface within said welding zone a row of closely-spaced bodies of protective metal, each of such bodies having a portion freely resting upon said surface, and at least one row of closely-spaced oxy-fuel gas torches directed to discharge welding flames upon each of said bodies and upon successive portions of said dome surface within said welding zone; means for reciprocating said torches and said bodies of protective metal at a fixed rate along a path of fixed length that extends approximately radially of said dome surface and between said axis and an outer margin of said surface; and means for directing supplemental heat upon a second surface of said valve head.

13. Apparatus for applying a welded-on overlay of protective metal upon the dome surface of a poppet-type valve, which comprises mechanism for rotating such article at a selected rate upon its longitudinal axis with said surface uppermost; means for applying a welded-on overlay of protective metal upon successive portions of such surface in an elongated welding zone on said surface, said means including mechanism for directing upon said surface within said welding zone a row of closely-spaced bodies of protective metal, each having a portion freely resting upon said surface and disposed between the axis of rotation of said valve and an outer margin of said dome surface, and at least one row of closely-spaced torches directed to discharge welding flames upon each of said bodies and upon successive portions of said surface within an area lying between said axis and an outer margin of said dome surface; means for reciprocating said torches and said bodies of protective metal as a unit at a fixed rate along a fixed path intersecting said surface within said welding zone; means for adjusting said torches in any of three different planes; and means for directing supplemental heating flames upon the under surface of said valves head opposite that being provided with said overlay.

14. Apparatus for applying a welded-on overlay of protective metal upon a surface of an article of revolution, which surface is normal to the axis of revolution of said article, which comprises a plurality of spaced work tables adapted to support a succession of poppet-type valves having heads with the dome surface of each valve head uppermost; means for rotating each of said work tables and a valve carried thereby upon an axis of rotation tilted from the vertical; means for moving each of such succession of work tables along a path of fixed length, and for intermittently discontinuing such movement at selected points in the path of movement of such work tables, thereby defining a preheating station, an overlay applying station, and an overlay remelting station; means at said preheating station for directing oxy-fuel gas flames against the head of a valve carried upon a work table located at such station; means at each of said overlay applying and overlay remelting stations for directing oxy-fuel gas flames upon the upper head surface of a valve carried upon a work table located at such station; means at said overlay applying station for feeding overlay metal to and depositing it upon the dome surface of the valve head; means disposed between said preheating station and said overlay applying station, and in the path of movement of a valve head supported on a work table, for briefly changing the rate of rotation of the valve carried by such work table a selected amount as the latter approaches said overlay applying station; and means disposed between said overlay applying station and said remelting station and in the path of movement of a valve head supported on a work table for briefly changing the rate of rotation of the valve carried by such work table a selected amount as the latter approaches said remelting station.

15. Apparatus for applying a welded-on overlay of protective metal upon an article having a surface of revolution generated by a line one end of which lies in the axis of revolution of said article, which comprises a plurality of spaced work tables adapted to support such an article with said surface uppermost; means for rotating each of said work tables and an article carried thereby upon said axis of revolution; means for moving each of a succession of said work tables a selected distance along a path of fixed length, and for intermittently discontinuing such movement at selected points in the path of travel of such work tables, thereby defining a preheating station, an overlay applying station, and an overlay remelting station; means at each of said stations for directing oxy-fuel gas flames upon a surface of an article disposed at such station, said surface being remote from the first-mentioned surface; means at said overlay applying station and at said remelting station for directing oxy-fuel gas flames upon the upper surface of an article carried by a corresponding work table disposed at each such station; means at said overlay applying station for feeding overlay metal to and depositing it upon the upper surface of such article; and means at the overlay remelting station for directing cooling fluid concurrently upon the free surface of the deposited metal and upon the surface of the article opposite that having such deposit, for conditioning the deposited metal.

16. Apparatus for applying a welded-on overlay of protective metal upon an article having a surface of revolution generated by a line one end of which lies in the axis of revolution of said article, which comprises a plurality of spaced work tables adapted to support such an article with said surface uppermost; means for rotating each of said work tables and an article carried thereby upon said axis of revolution; means for moving each of a succession of said work tables a selected distance along a path of fixed length, and for intermittently discontinuing such movement at selected points in the path of travel of such work tables, thereby defining a preheating station, an overlay applying station, and an overlay remelting station; means at each of said stations for directing oxy-fuel gas flames upon a surface of an article disposed at such station, said surface being remote from the first-mentioned surface; means at said overlay applying station and at said remelting station for directing oxy-fuel gas flames upon the upper surface of an article carried by a corresponding work table disposed at each such station; means at said overlay applying station for feeding overlay metal to and depositing it upon the upper surface of such article; and means at the overlay remelting station for directing upon the free surface of the deposited metal a wide stream of a cooling fluid; means for reciprocating such stream of cooling fluid back and forth within a conditioning zone on such free surface; and means for directing a cooling fluid upon a second surface of said article remote from said free surface.

17. Apparatus for applying a welded-on overlay of protective metal upon the dome surface of a valve head of the poppet-type, which comprises a plurality of work stations including a work preheating station, a valve surfacing station and a valve remelting and conditioning station; means at each station for supporting a valve with its longitudinal axis tilted from the vertical and with the dome surface of the valve head uppermost; means for intermittently moving a valve support to each of said stations in succession, and for discontinuing such movement when the valve support reaches such station; means at said preheating station for directing a preheating flame upon the under side of a valve head, for preheating the dome surface by conduction through the valve metal; means at said surfacing station for directing upon the valve dome surface during at least one revolution of the valve a plurality of merging streams of molten protective metal in a path extending from the portion of the dome surface coinciding with the axis of rotation of the valve to the outer peripheral margin of the dome surface, the last-named means including a main heating means directed upon the upper surface of the valve head, supplemental heating means directed upon the under side of the valve head, and means for adjusting said main heating means in any of three different planes.

18. Apparatus for applying a welded-on overlay of protective metal upon the dome surface of a valve head of the poppet-type, which comprises a plurality of work stations including a work preheating station, a valve surfacing station and a valve remelting and conditioning station; means at each station for supporting a valve with its longitudinal axis tilted from the vertical and with the dome surface of the valve head uppermost; means for intermittently moving a valve support to each of said stations in succession, and for discontinuing such movement when the valve support reaches such station; means at said preheating station for directing a preheating flame upon the under side of a valve head, for preheating the dome surface by conduction through the valve metal; means at said surfacing station for directing upon the valve dome surface during at least one revolution of the valve a plurality of merging streams of molten protective metal in a path extending from the portion of the dome surface coinciding with the axis of rotation of the valve to the outer peripheral margin of the dome surface, the last-named means including a main welding means directed upon the upper surface of the valve head, supplemental heating means directed upon the under side of the valve head, and means for adjusting said main welding means in any of three different planes; means at the remelting station for remelting successive portions of a solidified protective metal overlay on the dome surface of the valve, said remelting means comprising a main remelting torch directed to discharge welding flames upon the dome surface of a valve in an elongated zone disposed between the axis of rotation of the valve and an outer margin of the dome surface, and supplemental torch means directed to discharge heating flames upon the under surface of the valve head; means for reciprocating said main welding means across the dome surface of a valve being surfaced; means for reciprocating said main remelting torch across the dome surface of a valve having its overlay remelted; and means for regulating the lateral distance between the paths of reciprocation of the said main welding means and the said main remelting torch.

19. Apparatus for applying a welded-on overlay of protective metal upon an article having a surface of revolution generated by a line one end of which lies in the axis of revolution of said article, which comprises a plurality of spaced work tables adapted to support such an article with said surface uppermost; means for continuously rotating each of said work tables and an article carried thereby upon said axis of revolution; means for moving each of a succession of said work tables a selected distance along a path of fixed length, and for intermittently discontinuing such movement at selected points in the path of travel of such work tables, thereby defining a preheating station, an overlay applying station, and an overlay remelting station; means at each of said stations for directing oxy-fuel gas flames upon a surface of an article disposed at such station, said surface being remote from the first-mentioned surface; means at said overlay applying station and at said remelting station for directing oxy-fuel gas flames upon the upper surface of an article carried by a corresponding work table disposed at each such station; means at said overlay applying station for feeding overlay metal to and depositing it upon the upper surface of such articles; and means disposed between said preheating station and said overlay applying station and in the path of travel of an article supported on a work table moving to the latter station, and adapted to contact the article carried by a work table as the latter approaches said overlay applying station, and to retard the rate of rotation of said article.

20. Apparatus for applying a welded-on overlay of protective metal upon at least a portion of a surface of an article of revolution, which surface is intersected by the axis of revolution of said article, which comprises a plurality of spaced work tables adapted to support such an article with said surface uppermost; means for continuously rotating each of said work tables and an article carried thereby upon said axis of revolution; means for moving each of a succession of said work tables a selected distance along a path of fixed length, and for intermittently discontinuing such movement at selected points in the path of travel of such work tables, thereby defining a preheating station, an overlay applying station, and an overlay remelting station; means at each of said stations for directing oxy-fuel gas flames upon a surface of an article disposed at such station, said surface being remote from the first-mentioned surface; means at said overlay applying station and at said remelting station for directing oxy-fuel gas flames upon the upper surface of an article carried by a corresponding work table disposed at each such station; means at said overlay applying station for feeding overlay metal to and depositing it upon the upper surface of such article; and means disposed between said overlay applying station and said overlay remelting station and in the path of travel of an article supported on a work table moving to the latter station, said last-named means contacting said article to retard the rate of rotation of the latter as it approaches said remelting station.

21. Apparatus for applying a welded-on overlay of protective metal upon the dome surface of a valve head of the poppet-type, which comprises a platform; a plurality of work tables supported in spaced relation on said platform, each of such tables being adapted to support a valve with the dome surface of the valve uppermost; means for intermittently moving the platform a selected distance along a fixed path, and for discontinuing such movement at selected points in its path of travel, thereby defining a valve head preheating station, a valve head surfacing station and an overlay remelting station; means for continuously rotating each of such work tables upon an axis slightly inclined to the vertical at each of such stations during movement between stations; means at said stations for directing upon the under surface of a valve head preheating flames, welding flames and supplemental heating flames, respectively; means at said valve head surfacing station for directing a row of closely-spaced welding flames upon successive portions of the dome surface of a valve within an elongated welding zone disposed between the longitudinal axis of the valve and an outer margin of the valve head, and for concurrently melting a row of closely-spaced bodies of protective metal and merging such molten metal upon said dome surface within said welding zone; means at said remelting station for directing remelting flames upon successive solidified portions of the overlay of protective metal on the dome surface of the valve head, together with means for directing a cooling fluid respectively upon said dome surface and upon the lower surface of said valve head; and means disposed between said preheating station and said surfacing station in the path of movement of the work tables for retarding the rate of rotation of the valve carried by a work table as it approaches the latter station.

22. Apparatus for applying a welded-on overlay of protective metal upon the dome surface of a valve head of the poppet-type, which comprises a platform; a plurality of work tables supported in spaced relation on said platform, each of such tables being adapted to support a valve with the dome surface of the valve uppermost; means for intermittently moving the platform a selected distance along a fixed path, and for discontinuing such movement at selected points in its path of travel, thereby defining a valve head preheating station, a valve head surfacing station and an overlay remelting station; means for continuously rotating each of such work tables upon an axis slightly inclined to the vertical at each of such stations during movement between stations; means at said stations for directing upon the under surface of a valve head preheating flames, welding flames and supplemental heating flames, respectively; means at said valve head surfacing station for directing a row of closely-spaced welding flames upon successive portions of the dome surface of a valve within an elongated welding zone disposed between the longitudinal axis of the valve and an outer margin of the valve head, and for concurrently melting a row of closely-spaced bodies of protective metal and merging such molten metal upon said dome surface within said welding zone; means at said remelting station for directing remelting flames upon successive solidified portions of the overlay of protective metal on the dome surface of the valve head, together with means for directing a cooling fluid respectively upon said dome surface and upon the lower surface of said valve head; and means disposed between said surfacing station and said remelting station in the path of movement of the work tables for retarding or reversing the rotation of the valve carried by a work table as it approaches the latter station.

ROBERT L. WAGNER.

REFERENCES CITED

The following references are of record in the file of this patent:

UNITED STATES PATENTS

| Number | Name | Date |
|---|---|---|
| 1,241,900 | Armstrong | Oct. 2, 1917 |
| 2,267,296 | Bennewitz | Dec. 23, 1941 |
| 2,295,701 | Wagner | Sept. 15, 1942 |
| 2,295,702 | Wissler | Sept. 15, 1942 |
| 2,301,763 | Wagner | Nov. 10, 1942 |
| 2,110,755 | Bleakley | Mar. 8, 1938 |